Jan. 19, 1971 KISABURO OKUMA 3,555,726
HOLLOW CORD FOR EFFECTING REMOTE CONTROL OF TOYS
Filed April 16, 1968
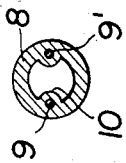
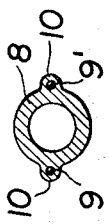
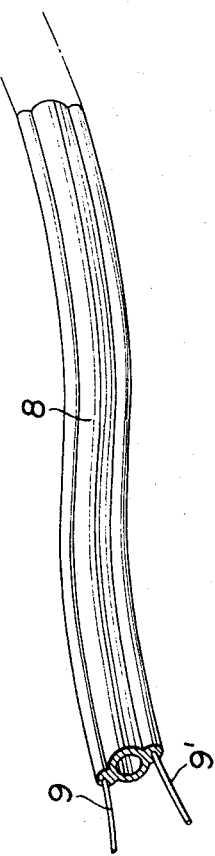
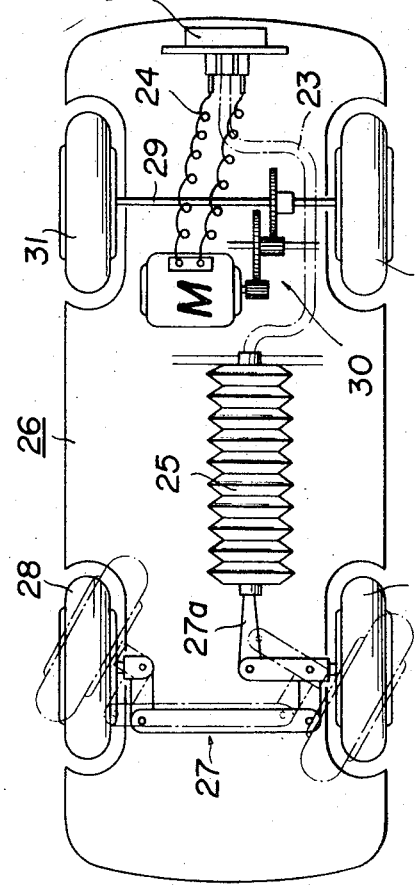
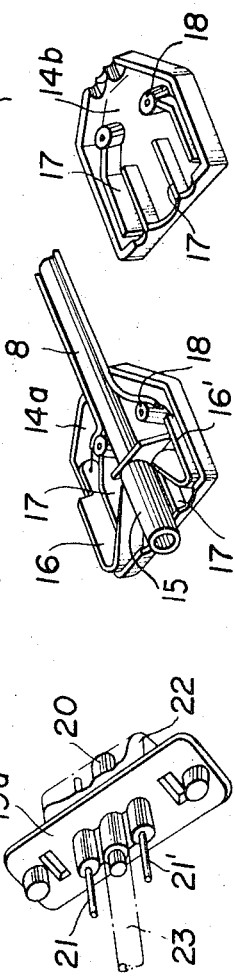
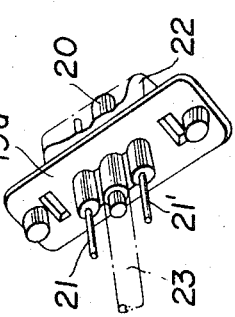
INVENTOR.
Kisaburo Okuma
BY Kelman and Berman
Agents

United States Patent Office 3,555,726
Patented Jan. 19, 1971

3,555,726
HOLLOW CORD FOR EFFECTING REMOTE CONTROL OF TOYS
Kisaburo Okuma, Saitama-ken, Japan, assignor to Okumasiesakujo Co., Ltd.
Filed Apr. 16, 1968, Ser. No. 721,711
Claims priority, application Japan, Feb. 15, 1968, 43/9,662
Int. Cl. A63h 33/26
U.S. Cl. 46—243    6 Claims

ABSTRACT OF THE DISCLOSURE

A hollow cord for pneumatically and electrically effecting remote control of movable toys comprising a narrow tubular member formed of polyvinyl chloride or other soft synthetic resin material, and at least one circuit of conductor members formed integrally with and embedded in said narrow tubular member. The tubular member and the conductor members can be plugged in a socket mounted on an object to be controlled, such as a movable toy or the like, so that a driving mechanism on said object can be controlled both electrically and pneumatically.

---

The present invention relates to a hollow cord for effecting remote control of movable toys.

Wires have been in use heretofore for effecting remote control of various types of toys including movable ones. The use of wires is disadvantageous in that they are easily bent and broken. Once they are stepped upon and crushed, wires can no longer serve the purpose of faithfully transmitting signals to an object to be controlled.

An object of the present invention is to provide a cord for effecting remote control of toys which can be produced on a mass production basis at a relatively low cost.

Another object of the invention is to provide a hollow cord for effecting remote control of toys which can be used for controlling an object either electrically or pneumatically or both electrically and penumatically at the same time.

The hollow cord according to this invention comprises a tubular member of polyvinyl chloride or other soft synthetic resin composition used for transmitting air under pressure, and at least one circuit of conductor members formed integrally with and embedded in said tubular member along its length.

The invention will be explained with reference to the drawings, in which:

FIG. 1 is a perspective view showing a hollow cord according to this invention;

FIG. 2(a) is a cross sectional view of the cord of FIG. 1;

FIG. 2(b) is a longitudinal sectional front view of a modification of the embodiment shown in FIG. 1;

FIG. 3 is a plan view showing the manner in which the hollow cord according to this invention is used for effecting remote control of a movable toy; and FIG. 4 shows connecting means of the hollow cord according to this invention, FIG. 4(a) being a perspective view, with certain parts being cut out, of a plug socket and FIG. 4(b) being an exploded perspective view of a plug.

In FIGS. 1 and 2, the hollow cord comprises a tubular member 8 which forms the longitudinal wall of a passage for transmitting air under pressure as subsequently to be described. The tubular member 8 is formed of polyvinyl chloride or other soft synthetic resinous material, and conductor members 9, 9' extending in the longitudinal direction of the tubular member 8 are molded into the tubular member and embedded on the inner or outer sides thereof.

The tubular member 8 is formed with external or internal longitudinal ribs 10, 10 in which the conductor members 9, 9' are embedded and electrically insulated. In the embodiments shown in FIGS. 1, 2(a), and 2(b), one pair of conductor members 9, 9' is employed, but it is to be understood that a plurality of circuits can be used in the hollow cord according to this invention. The hollow cord according to this invention is easy to produce, high in mechanical strength, and sturdy in structure.

In FIGS. 3 and 4, the tubular member 8 and the conductor members 9, 9' are connected at one end to an actuating mechanism housed in a casing 11. The tubular member maintains communication with means for supplying air under pressure of the actuating mechanism in said casing 11, said means for supplying air under pressure being operated by means of a steering wheel 12, while the conductor members 9, 9' are connected to a switch housed in said casing 11 and actuated by means of a knob 13. The means for supplying air under pressure may be a bellows-like member which is compressed and expanded as the steering wheel 12 is rotated, as is shown in my simultaneously filed application Serial No. 721,779 now Pat. 3,513,658, May 26, 1970. The switch (not shown) may be of a conventional type.

Attached to the other end of the tubular member 8 and the conductor members 9, 9' is a plug 14 whose shell consists of two halves 14a, and 14b which are normally connected. The half shell 14a, 14b which are identical in construction include partitions 17 for securing a connector tube 15 attached to the end of the tubular member 8 and contact springs 16, 16' secured to the ends of the conductor members 9, 9' respectively, and bosses 18, 18 for receiving therein screws connecting the two half shells.

Mounted on a movable toy to be controlled is a socket 19 in which the plug is to be inserted. A coupling tube 20 adapted to be inserted in the connecting tube 15 of the tubular member 8 and terminals 21, 21' adapted to maintain contact which the springs 16, 16' are secured to a base plate 19a of the socket 19. A receptacle 22 adapted to receive therein the plug 14 is formed integrally with the base plate 19' and disposed on said plate. The coupling tube 20 and the terminals 21, 21' extend through the base plate 19'. A narrow tube 23 is connected to the coupling tube 20, while leads 24 of a motor M are connected to the terminals 21, 21'. The narrow tube 23 is connected to a bellows-like member 25 one end of which is attached to a chassis 25 of the movable toy. The bellows-like member 26 is connected at its free end to an arm 27a which operates a steering linkage 27 to change the direction of the front wheels 28 in response to the compressing and expanding of the bellows-like member 25. The rotation of the motor M is transmitted through a reduction gearing 30 and an axle 29 to rear wheels 31 for driving the same.

In operation of the illustrated toy the plug 14 is inserted in the socket 19, whereby the actuating mechanism is connected electrically and pneumatically with the operation mechanism of the toy. If the steering wheel 12 is operated, air under pressure is supplied to or removed from the bellows-like member 25 so that the front wheels 28 change their direction of movement to the right or left. If the knob 13 is operated, the circuit connecting the motor M to a power source (not shown) is formed or broken, thereby permitting to start or stop the toy.

The toy to be controlled can readily be disconnected from the hollow cord according to this invention and from the actuating mechanism.

What I claim is:

1. In a toy including an operating mechanism, an actuating mechanism, and a cord connecting said mechanisms for remote control of the operating mechanism by the actuating mechanism, the improvement in the connecting cord which comprises:
   (a) an elongated tubular member of soft electrical insulating material adapted to contain air under pressure;
   (b) a pair of electrically conducting members embedded in said material and elongated longitudinally of said tubular member; and
   (c) releasably engageable connector means on said cord and on one of said mechanisms for transmitting said air and electric current between said cord and said mechanism, said connector means including;
      (1) a plug element and a socket element,
      (2) a pair of conductors and a conduit on each of said elements,
      (3) each of the conductors on one of said elements conductively engaging a conductor on the other elements, and the conduit on said one element sealingly engaging the conduit on the other element when said connector means are engaged.

2. In a toy as set forth in claim 1, said plug element having a shell, means securing one of said conduits in said shell, said one conduit being attached to said tubular member and communicating therewith, the conductors of said plug element being mounted in said casing and respectively connected to said conducting members.

3. In a toy as set forth in claim 2, said socket element including a receptacle member adapted to receive a portion of said plug element, the conduit on said socket element being partly received in the conduit on said plug element when said receptacle member receives said portion of the plug element.

4. In a toy as set forth in claim 1 said tubular member being formed with an integral longitudinal rib, one of said conducting members being embedded in said rib.

5. In a toy as set forth in claim 1, said tubular member constituting the wall of a longitudinal passage therein for the transmitted air and being formed with an integral external rib of said material, one of said conductors being embedded in said rib.

6. In a toy as set forth in claim 1, said tubular member constituting the wall of a longitudinal passage therein for the transmitted air and being formed with an integral rib projecting from said wall into said passage, one of said conductors being embedded in said rib.

References Cited

UNITED STATES PATENTS

| | | | |
|---|---|---|---|
| 2,638,712 | 5/1953 | Jackson | 46—210X |
| 2,688,821 | 9/1954 | Bunting | 46—210X |
| 2,940,217 | 6/1960 | Hauge | 46—210X |

LOUIS G. MANCENE, Primary Examiner

ROBERT F. CUTTING, Assistant Examiner

U.S. Cl. X.R.

46—210